(12) United States Patent
King et al.

(10) Patent No.: US 11,682,391 B2
(45) Date of Patent: Jun. 20, 2023

(54) ELECTRONIC COMMUNICATIONS DEVICE HAVING A USER INTERFACE INCLUDING A SINGLE INPUT INTERFACE FOR ELECTRONIC DIGITAL ASSISTANT AND VOICE CONTROL ACCESS

(71) Applicant: MOTOROLA SOLUTIONS, INC., Chicago, IL (US)

(72) Inventors: Melanie King, Hollywood, FL (US); Craig Siddoway, Davie, FL (US); Erin B. Bryant, Plantation, FL (US); Sean Regan, Boca Raton, FL (US); Alejandro G. Blanco, Charlotte, NC (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 554 days.

(21) Appl. No.: 16/834,660

(22) Filed: Mar. 30, 2020

(65) Prior Publication Data

US 2021/0304745 A1 Sep. 30, 2021

(51) Int. Cl.
*G10L 15/20* (2006.01)
*G10L 15/22* (2006.01)
(Continued)

(52) U.S. Cl.
CPC .............. *G10L 15/22* (2013.01); *G10L 15/19* (2013.01); *G10L 21/16* (2013.01); *H04M 1/724* (2021.01);
(Continued)

(58) Field of Classification Search
CPC ......... G10L 15/22; G10L 15/19; G10L 21/16; G10L 2015/088; G10L 15/08;
(Continued)

(56) References Cited

U.S. PATENT DOCUMENTS 7,393,151 B1 7/2008 Miller, Jr.
9,961,516 B1 5/2018 Proctor
(Continued)

FOREIGN PATENT DOCUMENTS

IN 209595 9/2007
WO 2019216779 A1 11/2019

OTHER PUBLICATIONS

The International Search Report and the Written Opinion corresponding patent application No. PCT6/US2021/021871 filed: Mar. 11, 2021, dated Jul. 22, 2021, all pages.

*Primary Examiner* — Huyen X Vo

(57) ABSTRACT

A process for interfacing with an electronic communications device including a single input interface (SII) for accessing an electronic digital assistant and voice control includes detecting a first activation of the SII, and responsively playing back a first audio feedback indicative of activation of a voice input function. Then monitoring for one of two or more pre-configured voice control keywords, a first associated with a local electronic communications device function and a second associated with initiating a particular infrastructure-based electronic digital assistant function. When the first, playing back a second audio feedback indicative of acknowledgement of a local device function, and performing the local device function; when the second, playing back, a third audio feedback indicative of acknowledgement of a infrastructure-based electronic digital assistant function, and performing the infrastructure-based electronic digital assistant function.

20 Claims, 8 Drawing Sheets

(51) Int. Cl.
  *H04M 1/724*  (2021.01)
  *G10L 15/19*  (2013.01)
  *G10L 21/16*  (2013.01)
  *G10L 15/08*  (2006.01)

(52) U.S. Cl.
  CPC .. *G10L 2015/088* (2013.01); *G10L 2015/225* (2013.01); *H04M 2250/74* (2013.01)

(58) Field of Classification Search
  CPC .... G10L 2015/225; G10L 15/00; A61F 11/04; H04M 1/724; H04M 2250/74; H04M 1/271; G06F 3/167; G06F 3/16
  See application file for complete search history.

(56) References Cited

U.S. PATENT DOCUMENTS

| | | | |
|---|---|---|---|
| 10,372,755 B2 | 8/2019 | Blanco | |
| 10,854,206 B1* | 12/2020 | Liu | H04L 67/306 |
| 10,891,947 B1* | 1/2021 | Le Chevalier | H04R 1/403 |
| 2004/0220723 A1 | 11/2004 | Gould Bear et al. | |
| 2005/0073436 A1 | 4/2005 | Negreiro | |
| 2014/0195252 A1 | 7/2014 | Gruber et al. | |
| 2018/0181656 A1 | 6/2018 | Proctor | |
| 2019/0115026 A1* | 4/2019 | Sharifi | G10L 15/08 |
| 2019/0179611 A1 | 6/2019 | Wojogbe et al. | |
| 2019/0259382 A1 | 8/2019 | Stogner et al. | |
| 2020/0034108 A1* | 1/2020 | Mozer | G06F 3/167 |
| 2020/0342869 A1 | 10/2020 | Lee et al. | |
| 2021/0035571 A1* | 2/2021 | Yun | G06V 10/143 |
| 2021/0174921 A1* | 6/2021 | Albrecht | H04W 12/67 |
| 2021/0358496 A1* | 11/2021 | Sukumar | G10L 15/08 |

\* cited by examiner

ELECTRONIC COMMUNICATIONS DEVICE
HAVING A USER INTERFACE INCLUDING A
SINGLE INPUT INTERFACE FOR
ELECTRONIC DIGITAL ASSISTANT AND
VOICE CONTROL ACCESS

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise voice control functions that may provide access to local features, functions, or variable parameters at the local device (e.g., wherein a limited voice recognition engine operating entirely at the local device is capable of matching a limited number of keywords voiced by a user for accessing said local features, functions, or variable parameters). Because the processing power of the (typically battery-powered) communication device is limited compared to cloud-based processing power and databases (e.g., such as available via the Amazon Web Services (AWS) cloud compute cluster or Microsoft Azure cloud compute cluster), a keyword matching engine with a limited number of matching keywords (e.g., a voice control dictionary) is typically used for voice control instead of an intent engine that attempts to discover the intent of the user's spoken request. Such local features, functions, or variable parameters operable at the local communication device via voice control may include, for example, changing a volume of an in-call or loudspeaker audio output device, changing a radio channel of the communication device, and reporting a battery-remaining level of a battery of the communication device, and other examples exist as well. Such local features are typically available to the communication device user independent of an existence of a network connection connecting the communication device to one or more servers or cloud-based compute clusters via a wired and/or wireless interface.

Many such communication devices further comprise, or provide access to, electronic digital assistants (or sometimes referenced as "virtual partners" or "virtual assistants") that may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. In contrast to voice control features functioning at the local device, these electronic digital assistants typically transmit voice captured at the local device to a server or cloud-compute cluster such as those noted above, so that an intent of the user can be discovered, and a more intelligent and tailored response provided to the user in light of the determined intent, and not based simply on matching keywords. As a result, such electronic digital assistants typically rely upon an available network connection (wired or wireless) to the server or cloud-compute cluster and an absence of such a network connection may temporarily disable access to such electronic digital assistant features at the local communication device.

These electronic digital assistants may perform tasks such as looking up information in remote databases such as vehicular license plate information or driver's license information in a remote department of motor vehicle database, requesting additional backup at an incident scene, warning other users or officers of nearby dangers such as traffic accidents or environmental hazards, and providing many other types of information in a reactive or proactive manner using the available network connection and operating on user provided voice intents.

BRIEF DESCRIPTION OF THE SEVERAL
VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
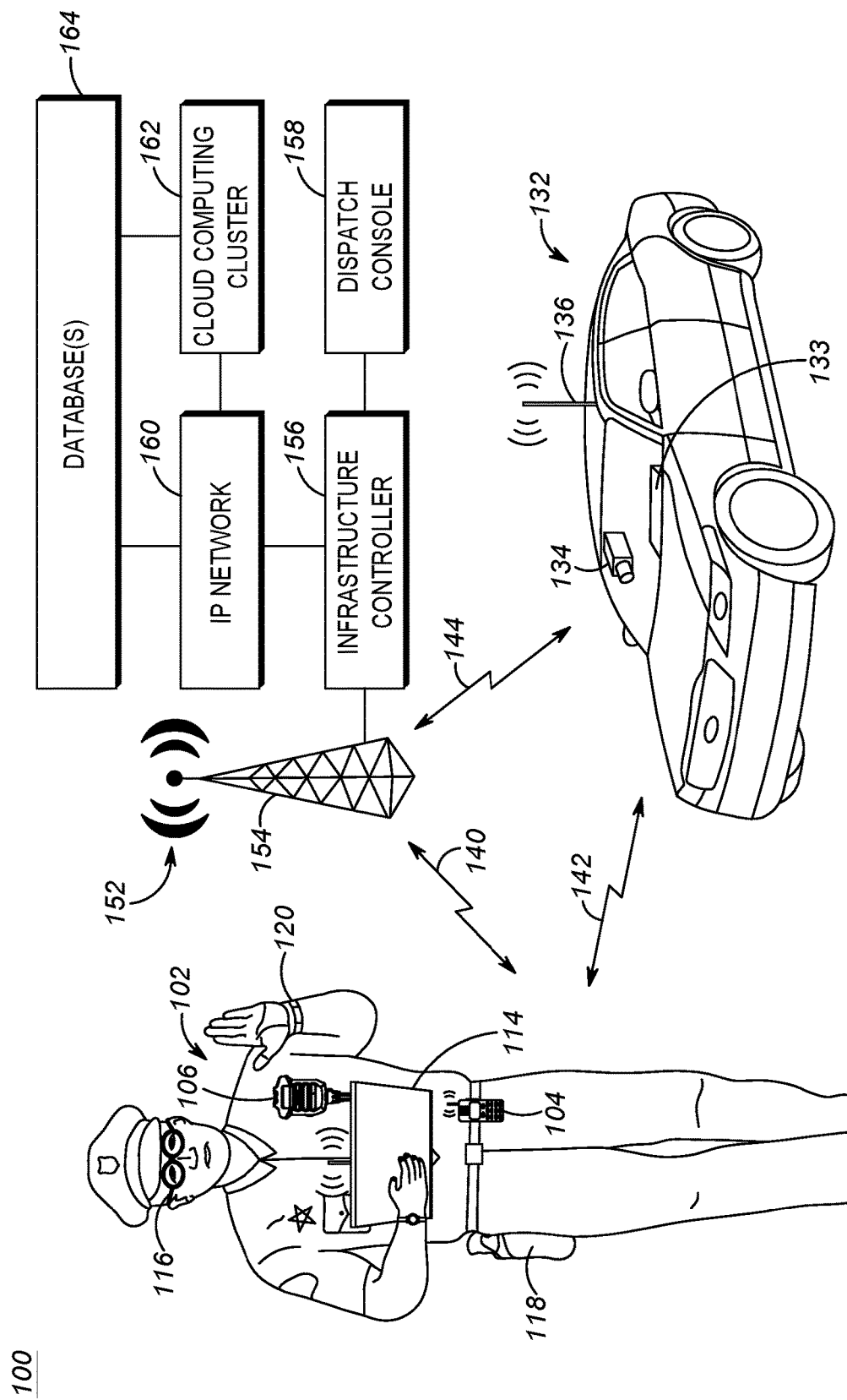
FIG. 1 is a system diagram illustrating a system for operating a user interface at a communication device including a single input interface for electronic digital assistant and voice control access, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In many cases, electronic communications devices may support only one of voice control and electronic digital assistant features. In those cases where a device may be intended to support both features, separate user interfaces could be provided for activating those features (e.g., a separate voice control activation button and separate electronic digital assistant activation button). However, providing separate voice control and electronic digital assistant features may be confusing to users and difficult for the user to find and operate the correct interface in high-stress and/or gloved environments, such as when the user is a first responder police officer responding to an incident or when the user is a firefighter responding to a fire.

Thus, there exists a need for an improved technical method, device, and system for an electronic communications device having a user interface including a single input interface for electronic digital assistant and voice control access, and electronic mechanisms for differentiating user access to both in a eyes-up, intuitive manner so as to enable users to more quickly and easily access both voice control and electronic digital assistant features even in high-stress environments and/or via gloved hands.

In one embodiment an electronic communications device having a user interface including a single input interface for electronic digital assistant and voice control access includes: a single voice function external input interface for accessing both a voice control function for controlling local electronic communications device functions via voice and an electronic digital assistant function for performing infrastructure-based electronic digital assistant functions via voice; one of an audio and haptic feedback interface for providing respective audio and haptic feedback to a user of the electronic communication device; a microphone; a memory; a transceiver; and a controller configured to: detect a first activation of the single voice function external input interface, and responsively: play back, via the one of the audio and haptic feedback interface, a first audio or haptic feedback indicative of activation of a voice input function; monitor, via the microphone, for a particular one of two or more pre-configured voice control keywords, at least a first particular one of the two or more pre-configured voice control keywords associated with a particular local electronic communications device function and at least a second particular one of the two or more pre-configured voice control keywords associated with initiating a particular infrastructure-based electronic digital assistant function; when the first particular one of the pre-configured voice control keywords is detected via the monitoring, responsively playing back, via the one of the audio and haptic feedback interface, a second audio or haptic feedback different from the first and indicative of acknowledgement of a voice instruction to perform the particular local electronic communications device function, and performing the particular local electronic communications device function; when the second particular one of the pre-configured voice control keywords is detected via the monitoring, responsively: play back, via the one of the audio and haptic feedback interface, a third audio or haptic feedback different from the first and second and indicative of acknowledgement of a voice instruction to initiate the particular infrastructure-based electronic digital assistant function; perform, via the transceiver and as a function of one of an intent captured via the second particular one of the pre-configured voice control keywords and a further intent captured via the microphone after play back of the third audio or haptic feedback, the particular infrastructure-based electronic digital assistant function; and provide, via one of a display and the speaker, a result of the particular infrastructure-based electronic digital assistant function received via the transceiver.

In a further embodiment, a process for interfacing with an electronic communications device having a user interface including a single input interface for accessing an electronic digital assistant and voice control, the method comprising: detecting a first activation of a single voice function external input interface for accessing both a voice control function for controlling local electronic communications device functions via voice and an electronic digital assistant function for performing infrastructure-based electronic digital assistant functions via voice, and responsively: playing back, via the one of an audio and haptic feedback interface, a first audio or haptic feedback indicative of activation of a voice input function; monitoring, via a microphone, for a particular one of two or more pre-configured voice control keywords, at least a first particular one of the two or more pre-configured voice control keywords associated with a particular local electronic communications device function and at least a second particular one of the two or more pre-configured voice control keywords associated with initiating a particular infrastructure-based electronic digital assistant function; when the first particular one of the pre-configured voice control keywords is detected via the monitoring, responsively playing back, via the one of the audio and haptic feedback interface, a second audio or haptic feedback different from the first and indicative of acknowledgement of a voice instruction to perform the particular local electronic communications device function, and performing the particular local electronic communications device function; when the second particular one of the pre-configured voice control keywords is detected via the monitoring, responsively: playing back, via the one of the audio and haptic feedback interface, a third audio or haptic feedback different from the first and second and indicative of acknowledgement of a voice instruction to initiate the particular infrastructure-based electronic digital assistant function; performing, via the transceiver and as a function of one of an intent captured via the second particular one of the pre-configured voice control keywords and a further intent captured via the microphone after playing back of the third audio or haptic feedback, the particular infrastructure-based electronic digital assistant function; and providing, via one of a display and the speaker, a result of the particular infrastructure-based electronic digital assistant function received via the transceiver.

In a further embodiment, a system for interfacing with an electronic communications device having a user interface including a single input interface for accessing an electronic digital assistant and voice control includes: an electronic communications device having a user interface including a single input interface for electronic digital assistant and voice control access, the electronic device comprising: a single voice function external input interface for accessing both a voice control function for controlling local electronic communications device functions via voice and an electronic digital assistant function for performing infrastructure-based electronic digital assistant functions via voice; one of an audio and haptic feedback interface for providing respective audio and haptic feedback to a user of the electronic communication device; a microphone; a memory; a transceiver; and a controller configured to: detect a first activation of the single voice function external input interface, and responsively: play back, via the one of the audio and haptic feedback interface, a first audio or haptic feedback indicative of activation of a voice input function; monitor, via the microphone, for a particular one of two or more pre-configured voice control keywords, at least a first particular one of the two or more pre-configured voice control keywords associated with a particular local electronic communications device function and at least a second particular one of the two or more pre-configured voice control keywords associated with initiating a particular infrastructure-based electronic digital assistant function; when the first particular one of the pre-configured voice control keywords is detected via the monitoring, responsively playing back, via the one of the audio and haptic feedback interface, a second audio or haptic feedback different from the first and indicative of acknowledgement of a voice instruction to perform the particular local electronic communications device function, and performing the particular local electronic communications device function; when the second particular one of the pre-configured voice control keywords is detected via the monitoring, responsively: play back, via the one of the audio and haptic feedback interface, a third audio or haptic feedback different from the first and second and indicative of acknowledgement of a voice instruction to initiate the particular infrastructure-based electronic digital assistant function; provide, via the transceiver and to an infrastructure-based natural language processing server, one of an intent captured via the second particular one of the pre-configured voice control keywords and a further intent captured via the microphone after play back of the third audio or haptic feedback for performing the particular infrastructure-based electronic digital assistant function; and provide, via one of a display and the speaker, a result of the particular infrastructure-based electronic digital assistant function received via the transceiver; an infrastructure natural language processing server comprising: a second memory; a second transceiver; and a second controller configured to: receive, via the second transceiver and from the electronic communications device, the one of the intent captured via the second particular one of the pre-configured voice control keywords and the further intent captured via the microphone after play back of the third audio or haptic feedback for performing the particular infrastructure-based electronic digital assistant function; perform the particular infrastructure-based electronic digital assistant function; and transmit, via the second transceiver, the result of the particular infrastructure-based electronic digital assistant function to the electronic communications device via the second transceiver for play back.

Each of the above-mentioned embodiments will be discussed in more detail below, starting with example system and device architectures of the system in which the embodiments may be practiced, followed by an illustration of processing blocks for achieving an improved technical method, device, and system for an electronic communications device having a user interface including a single input interface for electronic digital assistant and voice control access. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

1. COMMUNICATION SYSTEM AND DEVICE STRUCTURES a. Communication System Structure Referring now to the drawings, and in particular FIG. 1, a communication system diagram illustrates a system 100 of devices including a first set of devices that a user 102

(illustrated in FIG. 1 as a first responder police officer) may wear, such as a primary battery-powered portable radio 104 used for narrowband and/or broadband direct-mode or infrastructure communications, a battery-powered radio speaker microphone (RSM) 106, a laptop 114 having an integrated video camera and used for data applications such as incident support applications, smart glasses 116 (e.g., which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a respective single vehicular video camera 134 and transceiver 136, in other embodiments, the vehicle 132 may include additional same or similar video cameras and/or transceivers, and additional vehicles may be present with respective additional sets of video cameras and/or transceivers.

Each of the portable radio 104, RSM 106, laptop 114, and vehicle 132 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE) (including LTE-Advanced or LTE-Advanced Pro compliant with, for example, the 3GPP TS 36 specification series), or 5G (including a network architecture compliant with, for example, the 3GPP TS 23 specification series and a new radio (NR) air interface compliant with the 3GPP TS 38 specification series) standard or protocol, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoW), or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM 106, and/or the laptop 114 may communicatively couple.

In order to communicate with and exchange video, audio, and other media and communications with the RSM 106 and/or the laptop 114, the portable radio 104 may contain one or more physical electronic ports (such as a USB port, an Ethernet port, an audio jack, etc.) for direct electronic coupling with the RSM 106 or laptop 114. In some embodiments, the portable radio 104 may contain a short-range transmitter (e.g., in comparison to the long-range transmitter such as a LMR or Broadband transmitter) and/or transceiver for wirelessly coupling with the RSM 106 or laptop 114. The short-range transmitter may be a Bluetooth, Zigbee, or NFC transmitter having a transmit range on the order of 0.01-100 meters, or 0.1-10 meters. In other embodiments, the RSM 106 and/or the laptop 114 may contain their own long-range transceivers and may communicate with one another and/or with the infrastructure RAN 152 or vehicular transceiver 136 directly without passing through portable radio 104.

The RSM 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM 106 to other communication devices or from the infrastructure RAN 152. The voice and/or audio played back at the remote speaker may be received from the portable radio 104 or directly from one or more other communication devices or the infrastructure RAN. The RSM 106 may include a separate physical PTT switch that functions, in cooperation with the portable radio 104 or on its own, to maintain the portable radio 104 and/or RSM 106 in a monitor only mode, and which switches the device(s) to a transmit-only mode (for half-duplex devices) or transmit and receive mode (for full-duplex devices) upon depression or activation of the PTT switch. The portable radio 104 and/or RSM 106 may form part of a group communications architecture that allows a single communication device to communicate with one or more group members (not shown) associated with a particular group of devices at a same time. In some embodiments, the RSM 106 may be a traditional RSM, and may not include the video capture and/or display elements described herein with respect to FIG. 1.

Additional or alternatively, other features may be provided at the RSM 106 as well. For example, a display screen may be provided for displaying images, video, and/or text to the user 102 or to someone else. The display screen may be, for example, a liquid crystal display (LCD) screen or an organic light emitting display (OLED) display screen. In some embodiments, a touch sensitive input interface may be incorporated into the display screen as well, allowing the user 102 to interact with content provided on the display scr. A soft PTT input may also be provided, for example, via such a touch interface.

A video camera may also be provided at the RSM 106, integrating an ability to capture images and/or video and store the captured image data (for further analysis) or transmit the captured image data as an image or video stream to the portable radio 104 and/or to other communication devices or to the infrastructure RAN 152 directly. The video camera and RSM remote microphone may be used, for example, for capturing audio and/or video of a suspect and the suspect's surroundings, storing the captured image and/ or audio data for further analysis or transmitting the captured image and/or audio data as a video and/or audio stream to the portable radio 104 and/or to other communication devices or to the infrastructure RAN directly for further analysis. An RSM remote microphone of the RSM 106 may be a directional or unidirectional microphone or array of directional or unidirectional microphones that, in the case of directional or arrays of microphones, may be capable of identifying a direction from which a captured sound emanated.

In some embodiments, the RSM 106 may be replaced with a more limited body worn camera that may include the video camera and/or microphone noted above for capturing audio and/or video, but may forego one or more of the features noted above that transform the body worn camera into a more full featured RSM, such as the separate physical PTT switch and the display screen, remote microphone functionality for voice communications in cooperation with portable radio 104, and remote speaker.

The laptop 114, in particular, may be any wireless communication device used for infrastructure RAN or direct-mode media communication via a long-range or short-range wireless transmitter with other communication devices and/ or the infrastructure RAN 152. The laptop 114 includes a display screen for displaying a user interface to an operating system and one or more applications running on the operating system, such as a broadband PTT communications application, a web browser application, a vehicle history database application, an arrest record database application, an outstanding warrant database application, a mapping and/or navigation application, a health information database application, or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM 106 (or any other electronic device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices.

The vehicle 132 associated with the user 102 may include the mobile communication device 133, the vehicular video camera 134, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above.

The vehicle 132 may be a human-operable vehicle, or may be a self-driving vehicle operable under control of mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location determination device integrated with or separately disposed in the mobile communication device 133 and/or transceiver 136 for determining (and storing and/or transmitting) a location of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless system, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster such as cloud compute cluster 162 communicably coupled to controller 156 via internet protocol (IP) network 160, among other possibilities.

The infrastructure RAN 152 is illustrated in FIG. 1 as providing coverage for the portable radio 104, RSM 106, laptop 114, and vehicle transceiver 136 via a single fixed terminal 154 coupled to a single infrastructure controller 156 (e.g., a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud compute cluster 162 accessible via the IP network 160 (such as the Internet), may additionally or alternatively operate as a back-end electronic digital assistant, a back-end audio and/or video processing device, and/or a storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud compute cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service. The cloud compute cluster 162 may execute one or more natural language processing (NLP) engines for receiving digital audio recorded at an end-user device such as portable radio 104 and/or RSM 106, determining an intent of the user from the received digital audio, and taking one or more responsive actions as set forth herein.

Database(s) 164 may be accessible via IP network 160 and/or cloud compute cluster 162, and may include databases such as a long-term video storage database, a historical or forecasted weather database, an offender database perhaps including facial recognition images to match against, a cartographic database of streets and elevations, a vehicle license plate database, a driver's license database, a traffic database of historical or current traffic conditions, or other types of databases. Databases 164 may further include all or a portion of the databases described herein as being provided at infrastructure controller 156. In some embodiments, the databases 164 may be maintained by third parties (for example, the National Weather Service or a Department of Transportation, respectively). As shown in FIG. 1, the databases 164 are communicatively coupled with the infrastructure RAN 152 to allow the communication devices (for example, the portable radio 104, the RSM 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (e.g., a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (e.g., a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (e.g., a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (e.g., a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, front loader). As one other example, the communication system 100 may additionally or alternatively be a transportation logistics communication system including a user 102 that may be a bus driver or semi-truck driver at a school or transportation company and a vehicle 132 that may be a vehicle for use by the user 102 in furtherance of the driver's duties. Other possibilities exist as well.

b. Device Structure

Figure 2:
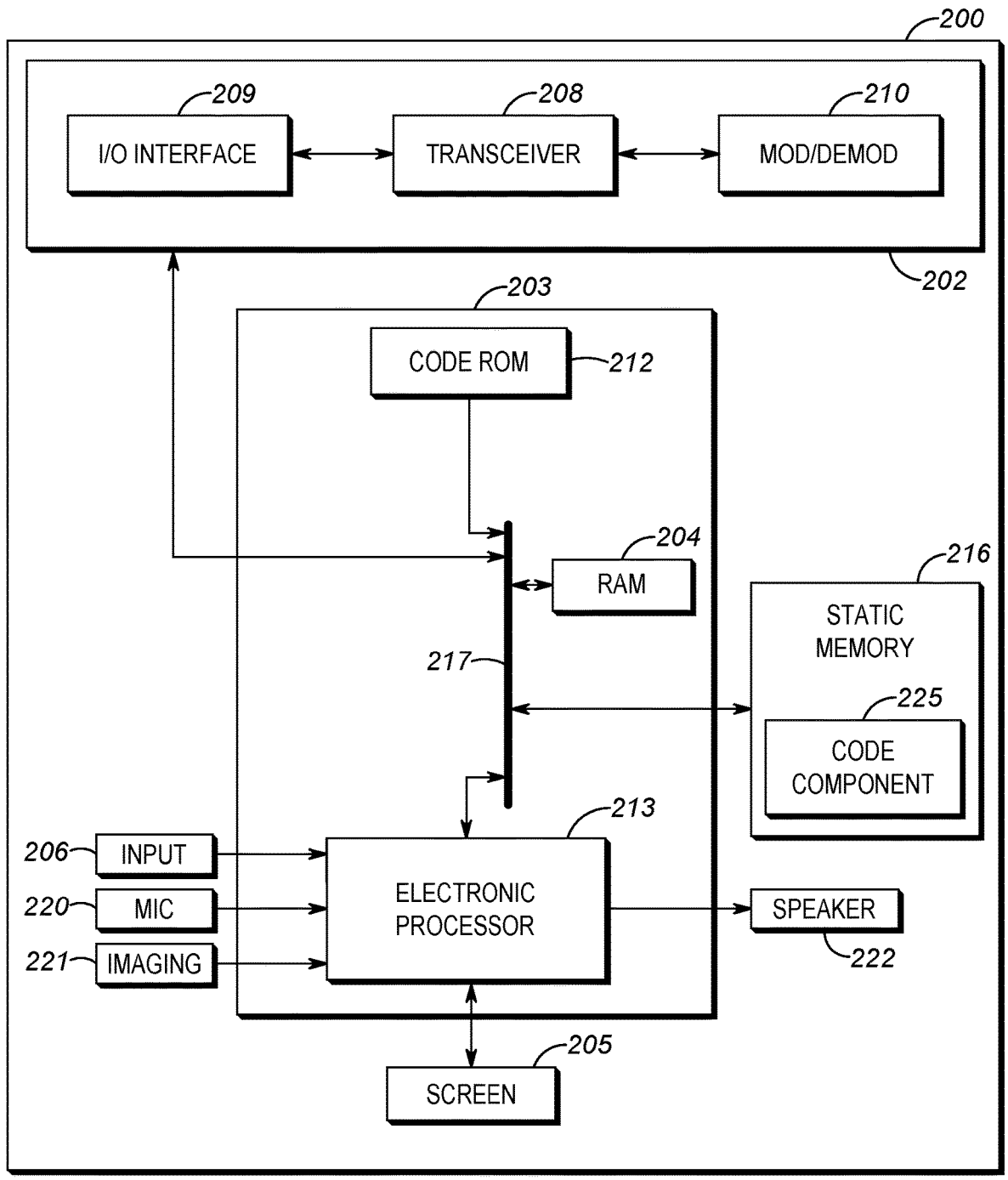
FIG. 2 is an internal device diagram showing a device structure of the electronic communication device including the single input interface for electronic digital assistant and voice control access, in accordance with some embodiments.

FIG. 2 sets forth a schematic diagram that illustrates a communication device 200 according to some embodiments of the present disclosure. The communication device 200 may be, for example, embodied in the portable radio 104, the RSM 106, the laptop 114, the mobile communication device 133, the infrastructure controller 156, the dispatch console 158, one or more computing devices in the cloud compute cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIG. 1, depending on the type of the communication device, the communication device 200 may include fewer or additional components in configurations different from that illustrated in FIG. 2. For example, in some embodiments, communication device 200 acting as the infrastructure controller 156 may not include one or more of the screen 205, input device 206, microphone 220, imaging device 221, and speaker 222. As another example, in some embodiments, the communication device 200 acting as the portable radio 104 or the RSM 106 may further include a location determination device (for example, a global positioning system (GPS) receiver) as explained above. Other combinations are possible as well.

As shown in FIG. 2, communication device 200 includes a communications unit 202 coupled to a common data and address bus 217 of a processing unit 203. The communication device 200 may also include one or more input devices (e.g., keypad, pointing device, touch-sensitive surface, etc.) 206 and an electronic display screen 205 (which, in some embodiments, may be a touch screen and thus also act as an input device 206), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a 5G technology receiver, a WiMAX transceiver, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the input device 206, the microphone 220, the imaging device 221, and/or the speaker 222. Static memory 216 may store operating code 225 for the electronic processor 213 that, when executed, performs one or more of the blocks set forth in FIGS. 6-7 and accompanying text. The input device 206 may include the single input interface for electronic digital assistant and voice control access as will be described in more detail below In some embodiments, static memory 216 may also store, permanently or temporarily, one or more voice control dictionaries comprised of voice control keywords along with matching audio or voice tokens for each keyword, such tokens including, for example, digital audio for pattern matching, parameters of audio for feature analysis comparison, and/or trained neural network models or classifiers for corresponding voice keywords, among other possibilities.

The static memory 216 may comprise, for example, a hard-disk drive (HDD), an optical disk drive such as a compact disk (CD) drive or digital versatile disk (DVD) drive, a solid state drive (SSD), a flash memory drive, or a tape drive, and the like.

Figure 3A:
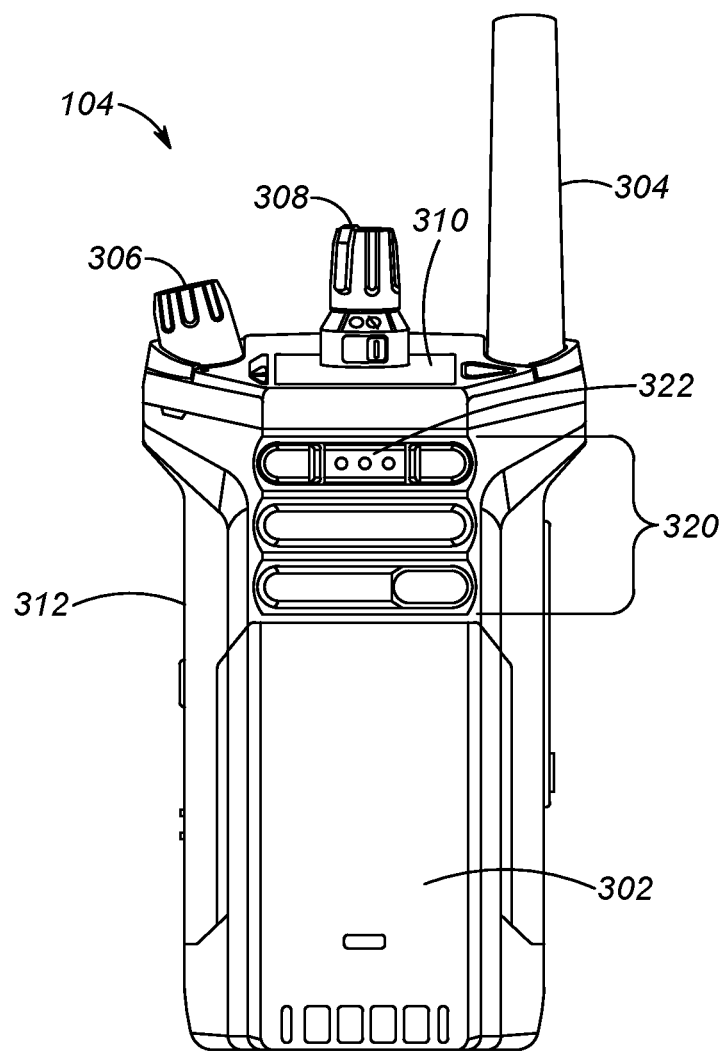
FIG. 3A is an external device diagram showing a device structure of a first electronic communication device including the single input interface for electronic digital assistant and voice control access, in accordance with some embodiments.

While FIG. 2 illustrated an example internal architecture of the radio 104 of FIG. 1, FIG. 3A illustrates an example external device diagram showing a device structure of the radio 104 as a first electronic communication device including the single input interface for electronic digital assistant and voice control access. As shown in FIG. 3A, the radio 104 may include a battery compartment 302 for housing a portable power source such as a lithium ion battery, an antenna 304 for radiating electromagnetic energy in accordance with a protocol as set forth above to communicate wirelessly with other radios and/or with an infrastructure such as the infrastructure RAN 152, an angled power/volume knob 306 for manually and mechanically powering on the radio and changing a volume of a speaker, a non-angled channel, zone, radio frequency change knob 308 for manually and mechanically changing a channel, zone, or radio frequency upon which the radio 104 operates, a top display 310 for displaying information elements such as battery level, network connectivity, mute status, and voice control or electronic digital assistant mode activation, a push-to-talk button 312 positioned on a side of the radio 104 for requesting to transmit to a person or group, a three-bar speaker grill 320 behind which a speaker is positioned, and a single input interface 322 for electronic digital assistant and voice control access. While, in this example, the single input interface 322 for accessing both the electronic digital assistant and voice control functions of the radio 104 is positioned within an upper-most bar of the three-bar speaker grill 320, in other embodiments, it may be positioned elsewhere in the three-bar speaker grill 320, or elsewhere on the radio 104, including but not limited to as a separate button on or adjacent the angled power/volume knob 306 or the non-angled channel, zone, radio frequency change knob 308. Furthermore, while in this example the single input interface 322 is a hard button on an external housing of the radio 104, in other embodiments, it may be a soft button accessible via a touch-screen placed in a similar or different position than that illustrated in FIG. 3A and, in some embodiments, may be a soft button accessible via top display 310, among other possibilities. Still further, while in some embodiments the single voice function external input interface may provide access to additional other functions at the electronic communications device than the electronic digital assistant and voice control functions not set forth herein (e.g., perhaps based on a number of times or amount of time it is held down or otherwise activated), in other embodiments, the single voice function external input interface provides access to no other functions at the electronic communications device than for accessing the electronic digital assistant and voice control functions.

Figure 3B:
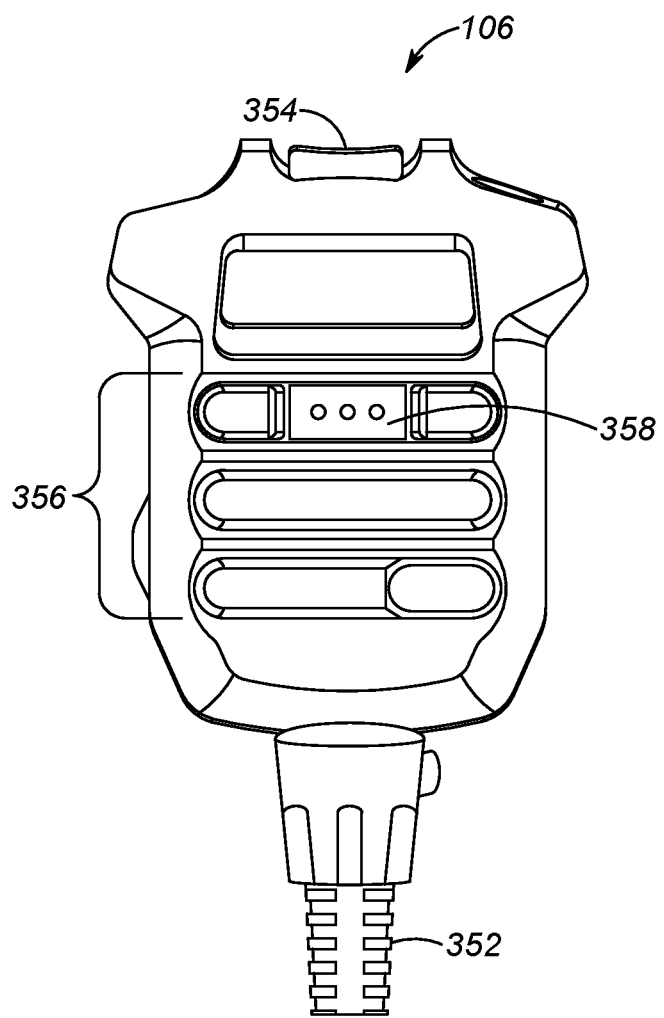
FIG. 3B is an external device diagram showing a device structure of a second electronic communication device including the single input interface for electronic digital assistant and voice control access, in accordance with some embodiments.

And while FIG. 2 illustrated an example internal architecture of the RSM 106 of FIG. 1, FIG. 3B illustrates an example external device diagram showing a device structure of the RSM 106 as a second electronic communication device including the single input interface for electronic digital assistant and voice control access. As shown in FIG. 3B, the RSM 106 may include a connector 352 for connecting with another electronic communication device, such as radio 104, to form a combined communication device, a separate push-to-talk button 354 positioned on a top of the RSM 106 for requesting to transmit to a person or group, a three-bar speaker grill 356 behind which a speaker is positioned, and a single input interface 358 for electronic digital assistant and voice control access. While this example illustrates an RSM that relies upon a connection (via connector 352) to another device such as radio 104 for full radio function support, in other embodiments, RSM 106 may include the features and functionality of radio 104 within its housing for communicating directly with other radios and infrastructure RAN 152, and thus may not include the connector 352.

While, in this example, the single input interface 358 for accessing both the electronic digital assistant and voice control functions of the RSM 106 is positioned within an upper-most bar of the three-bar speaker grill 356, in other embodiments, it may be positioned elsewhere in the three-bar speaker grill 356, or elsewhere on the RSM 106, including but not limited to as a separate button on or adjacent the push-to-talk button 354 or on a side of the RSM 106.

2. PROCESSES FOR INTERACTING WITH AN ELECTRONIC DIGITAL ASSISTANT FUNCTION AND VOICE CONTROL FUNCTION OF AN ELECTRONIC COMMUNICATIONS DEVICE VIA A SINGLE INPUT INTERFACE

Figure 4:
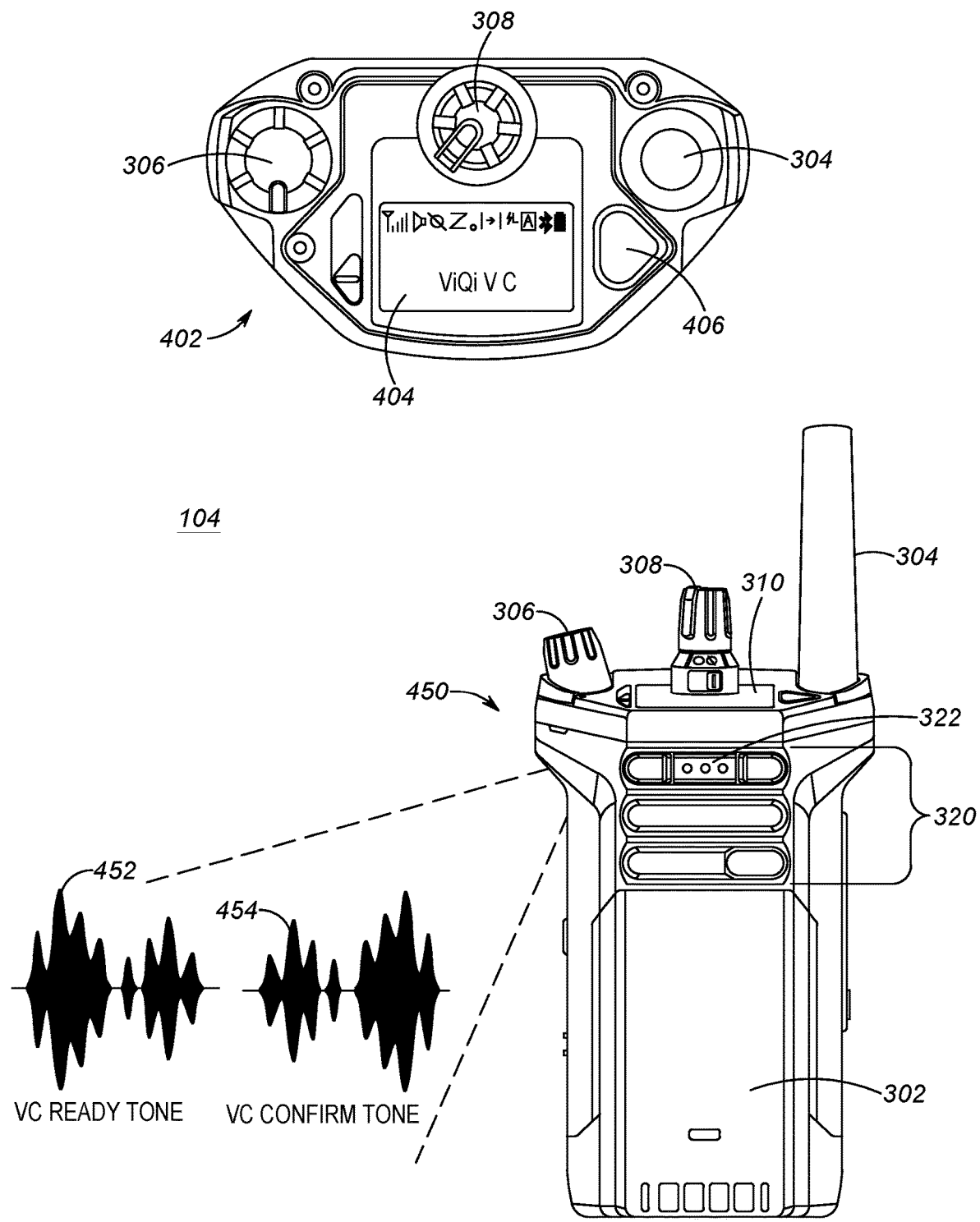
FIG. 4 illustrates an external device diagram showing a front-view and top-view of the first electronic communication device including the single input interface for electronic digital assistant and voice control access operating in the voice control mode, in accordance with some embodiments.
Figure 5:
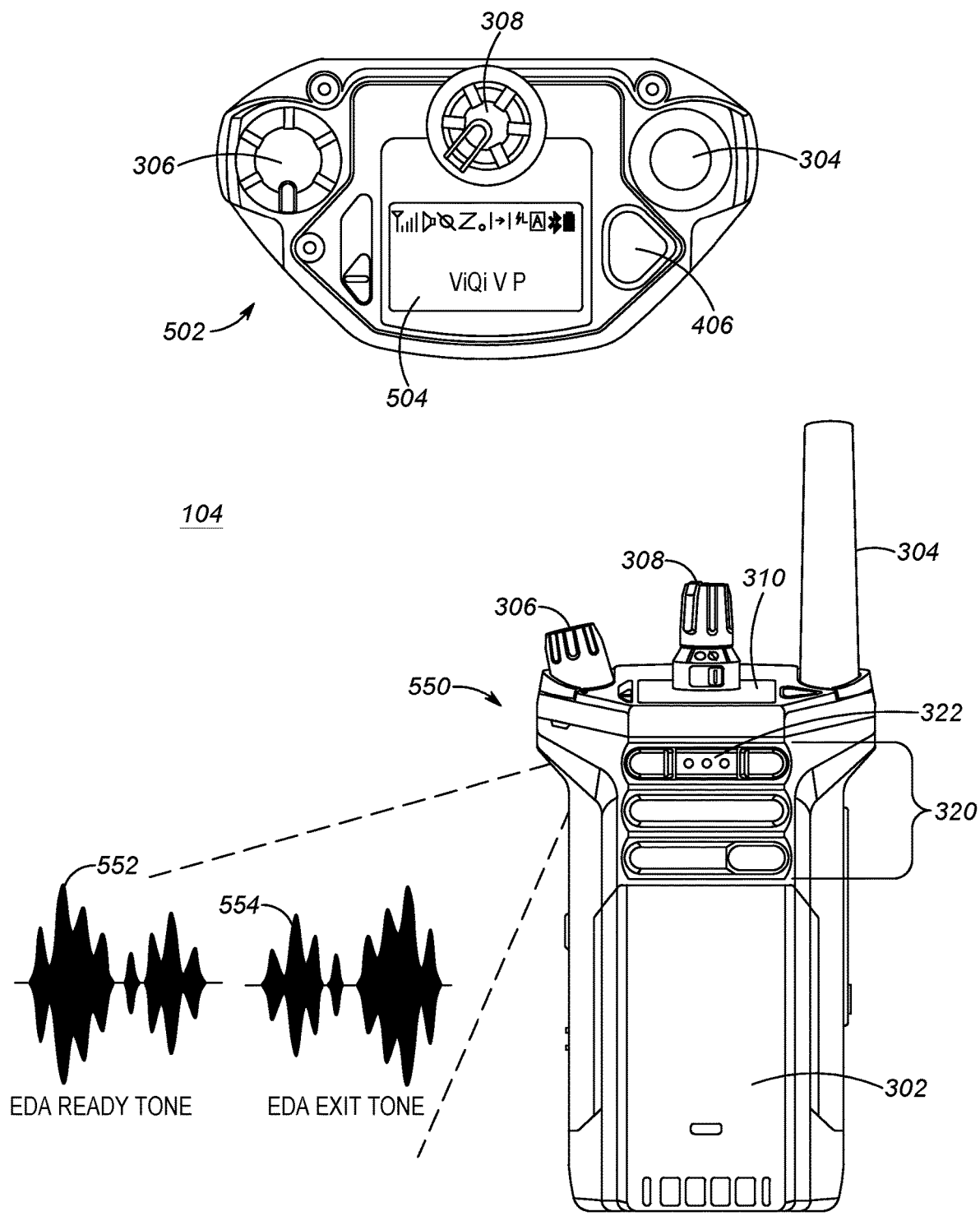
FIG. 5 illustrates an external device diagram showing a front-view and top-view of the first electronic communication device including the single input interface for electronic digital assistant and voice control access operating in the electronic digital assistant mode, in accordance with some embodiments.

FIGS. 4 and 5 set forth more specific external device diagrams for reference when describing the processes for interacting with an electronic digital assistant function and voice control function of an electronic communications device via a single input interface.

FIG. 4, in particular, illustrates an external device diagram showing a more detailed top-view 402 and front-view 450 of the first electronic communication device radio 104 including the single input interface 322 for electronic digital assistant and voice control access operating in the voice control mode. Descriptions of same reference characters from prior Figures are not repeated here, and instead, their description is incorporated by reference as it applies to FIG. 4. Furthermore, while the remainder of this description utilizes the radio 104 for ease of illustration of the single input interface with respect to blocks of process 600, in other embodiments, the RSM 106 may just as easily take its place, among other possible design form factors.

As shown in the top-view 402 of radio 104, the top display 404 may include a number of status indicators, including a mode indicator indicating a voice mode in which the radio 104 currently stands, which in this case and as shown in FIG. 4, is a voice control mode identified by the text indication "ViQi V C". Also shown in the top-view 402 is an emergency button 406 which may be mechanically manually activated, or, as will be described later, may be activated via voice control.

In the front-view 450, descriptions of same reference characters from prior Figures are similarly not repeated here, and instead, their description is incorporated by reference as it applies to FIG. 4. As shown in the front-view 450, a speaker displaced behind the speaker grill 320 and behind the single input interface 322 for electronic digital assistant and voice control access may output a unique (different from all other tones) voice control ready auditory tone 452 indicative that the single input interface 322 for electronic digital assistant and voice control access has been activated by a user, and provides a user an intuitive, eyes-up indication that the feature has been activated and that the radio is now monitoring for one of two or more pre-configured voice control keywords, as will be described in more detail with respect to FIGS. 6-7 below. Although in this example a voice control ready auditory tone 452 is described, in other embodiments, a unique haptic (e.g., vibratory or other non-auditory physical feedback) output may be provided in addition or instead of the auditory tone. The voice control ready auditory tone 452 may be a single tone or a sequence of tones and may, for example, include a tone in the range of 700-800 Hz for 20-30 ms followed by 20-30 ms of silence followed by a tone in the range of 1000-1100 Hz for 20-30 ms. Other possibilities exist as well.

FIG. 4 illustrates an external device diagram showing a more detailed top-view 402 and front-view 450 of the first electronic communication device radio 104 including the single input interface 322 for electronic digital assistant and voice control access operating in the voice control mode. Descriptions of same reference characters from prior Figures are not repeated here, and instead, their description is incorporated by reference as it applies to FIG. 4. As shown in the top-view 402 of radio 104, the top display 404 may include a number of status indicators, including a mode indicator indicating a voice mode in which the radio 104 currently stands, which in this case and as shown in FIG. 4, is a voice control mode identified by the text indication "ViQi V C". Also shown in the top-view 402 is an emergency button 406 which may be mechanically manually activated, or, as will be described later, may be activated via voice control.

In the front-view 450, descriptions of same reference characters from prior Figures are similarly not repeated here, and instead, their description is incorporated by reference as it applies to FIG. 4. As shown in the front-view 450, a speaker displaced behind the speaker grill 320 and behind the single input interface 322 for electronic digital assistant and voice control access may output a unique (different from all other tones) voice control ready auditory tone 452 indicative that the single input interface 322 for electronic digital assistant and voice control access has been activated by a user, and provides a user an intuitive, eyes-up indication that the feature has been activated and that the radio is now monitoring for one of two or more pre-configured voice control keywords, as will be described in more detail with respect to FIGS. 6-7 below. Although in this example an auditory tone 452 is described, in other embodiments, a unique haptic (e.g., vibratory or other non-auditory physical feedback) output may be provided in addition or instead of the auditory tone. The first auditory tone 452 may be a single tone or a sequence of tones and may, for example, include a tone in the range of 700-800 Hz for 20-30 ms followed by 20-30 ms of silence followed by a tone in the range of 1000-1100 Hz for 20-30 ms. Other possibilities exist as well.

Once a voice control keyword is further detected via a microphone input of the radio 104, successfully matched to a local voice token as stored at the radio (e.g., such as a voice token corresponding to a voice control keyword of "volume up 25%" or "volume 4"), a unique voice control confirmation auditory tone 454 indicative that a successful voice control command was recognized may be output by the speaker, providing a user an intuitive, eyes-up indication that the voice control command was recognized and will be, is, or has been executed at the radio 104. Although in this example a voice control confirmation auditory tone 454 is described, in other embodiments, a unique haptic output may be provided in addition or instead of the auditory tone. The voice control confirmation auditory tone 454 may be a single tone or a sequence of tones and may, for example, include a tone in the range of 700-800 Hz for 20-30 ms followed by 20-30 ms of silence followed by a tone in the range of 1000-1100 Hz for 20-30 ms. Other possibilities exist as well. In some embodiments, the voice control confirmation auditory tone 454 may be a voiced playback of the recognized voice command (e.g., a confirmatory "volume up 25%" or "volume 4") played back via stored digital audio or text-to-voice synthesized speech, among other possibilities. In still some embodiments, no voice control confirmation auditory tone 454 may be played back, but confirmation provided via a lack of an error auditory tone (e.g., a 'boink' or some other error tone when a voice control keyword is not received and/or recognized). Other possibilities exist as well.

FIG. 5, in particular, illustrates an external device diagram showing a more detailed top-view 502 and front-view 550 of the first electronic communication device radio 104 including the single input interface 322 for electronic digital assistant and voice control access operating in the electronic digital assistant mode. Descriptions of same reference characters from prior Figures are not repeated here, and instead, their description is incorporated by reference as it applies to FIG. 5. As shown in the top-view 502 of radio 104, the top display 504 may include a number of status indicators, including a mode indicator indicating a voice mode in which the radio 104 currently stands, which in this case and as shown in FIG. 5, is an electronic digital assistant mode identified by the text indication "ViQi V P".

In the front-view 550, descriptions of same reference characters from prior Figures are similarly not repeated here, and instead, their description is incorporated by reference as it applies to FIG. 5. As shown in the front-view 550, a speaker displaced behind the speaker grill 320 and behind the single input interface 322 for electronic digital assistant and voice control access may output a unique (different from all other tones) electronic digital assistant ready auditory tone 552 indicative that the electronic digital assistant function has been activated by the user (e.g., perhaps in response to the user voicing a voice control keyword associated with entering the electronic digital assistant function, among other possibilities), and which provides a user an intuitive, eyes-up indication that the feature has been activated and that the radio is now monitoring for an intent to be provided by the user, for transmission to an infrastructure for further processing and response, as will be described in more detail with respect to FIGS. 6-7 below. Although in this example an electronic digital assistant ready auditory tone 552 is described, in other embodiments, a unique haptic (e.g., vibratory or other non-auditory physical feedback) output may be provided in addition or instead of the auditory tone. The electronic digital assistant ready auditory tone 552 may be a single tone or a sequence of tones and may, for example, a tone in the range of 700-800 Hz for 20-30 ms followed by 20-30 ms of silence followed by a tone in the range of 1000-1100 Hz for 20-30 ms followed by 20-30 ms of silence followed by a tone in the range of 700-800 Hz for 20-30 ms followed by 20-30 ms of silence followed by a tone in the range of 1000-1100 Hz for 20-30 ms. Other possibilities exist as well. In some embodiments, the electronic digital assistant ready auditory tone 552 may be a voiced playback confirming entry into the electronic digital assistant mode (e.g., a voiced "go ahead" or "ready" or "partner") played back via stored digital audio or text-to-voice synthesized speech, among other possibilities. In further embodiments where the voice control keyword was a shortcut electronic digital assistant keyword (e.g., a license plate lookup voice control keyword such as "run license OHIO charlie tango 1 2 3 4"), the electronic digital assistant ready auditory tone 552 may instead be a confirmation of a detected electronic digital assistant request, and may be a voiced playback confirming receipt of the electronic digital assistant query (e.g., a voiced "running your query" or "run license OHIO charlie tango 1 2 3 4, correct?") played back via stored digital audio or text-to-voice synthesized speech, among other possibilities.

Once an electronic digital assistant intent has been detected (via the shortcut method) or is further detected via a microphone input of the radio 104, the intent is successfully provided to the infrastructure (such as via the infrastructure RAN 152), a response to the user intent is received (e.g., such as a response to a license plate query), and the response provided to the user (perhaps via the speaker of the radio 104 or via a screen display, among other possibilities), a unique electronic digital assistant exit auditory tone 554 indicative that the radio 104 has now exited the electronic digital assistant mode may be output by the speaker, providing a user an intuitive, eyes-up indication that the electronic digital assistant mode has been terminated at the radio 104. Although in this example an auditory tone 554 is described, in other embodiments, a unique haptic output may be provided in addition or instead of the auditory tone. The electronic digital assistant exit auditory tone 554 may be a single tone or a sequence of tones and may, for example, include a tone in the range of 1000-1100 Hz for 20-30 ms followed by 20-30 ms of silence followed by a tone in the range of 700-800 Hz for 20-30 ms. Other possibilities exist as well.

Figure 6:
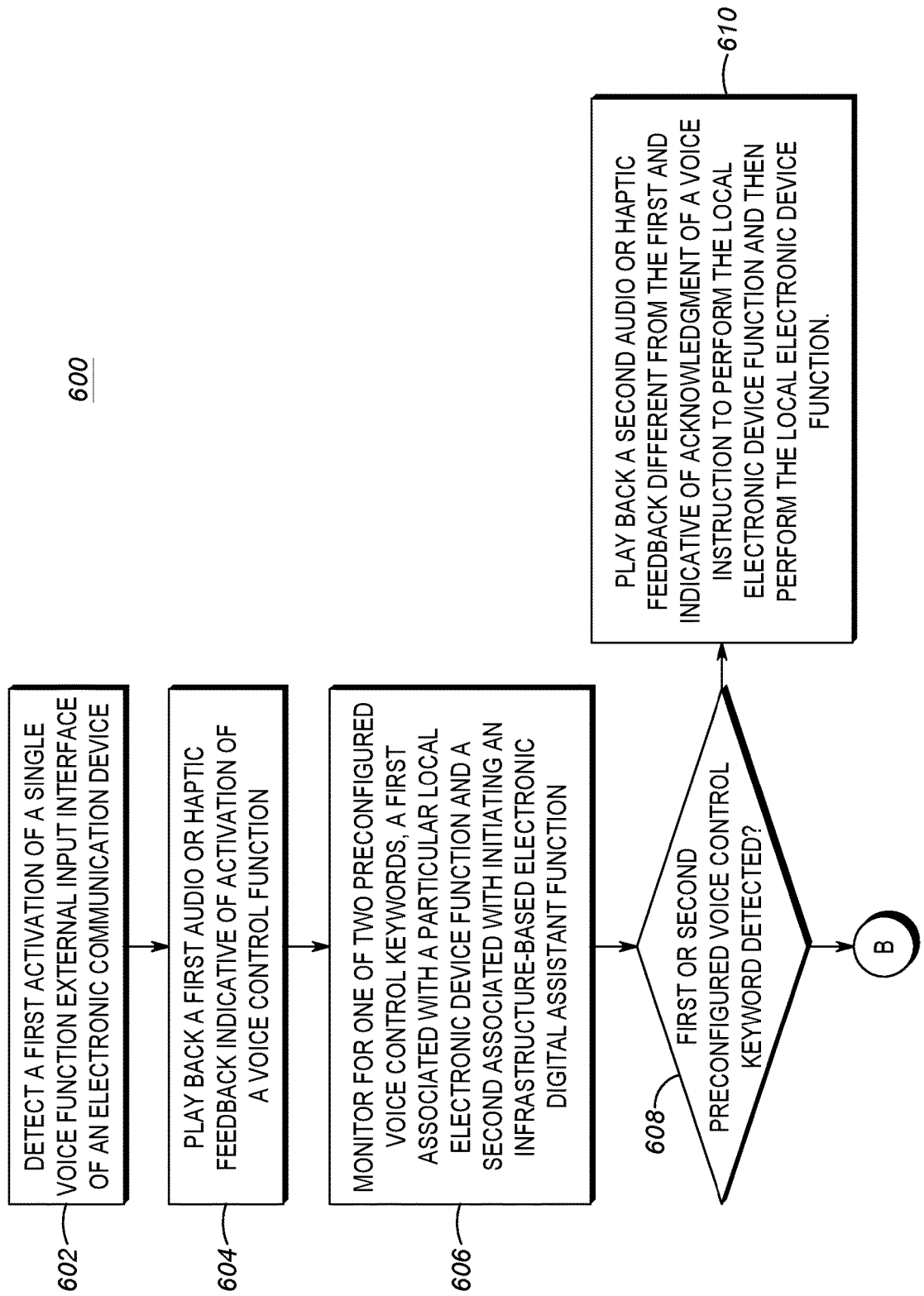
FIG. 6 illustrates a flowchart setting forth a first set of process blocks for operating the first or second electronic communication device including the single input interface for electronic digital assistant and voice control access, in accordance with some embodiments.
Figure 7:
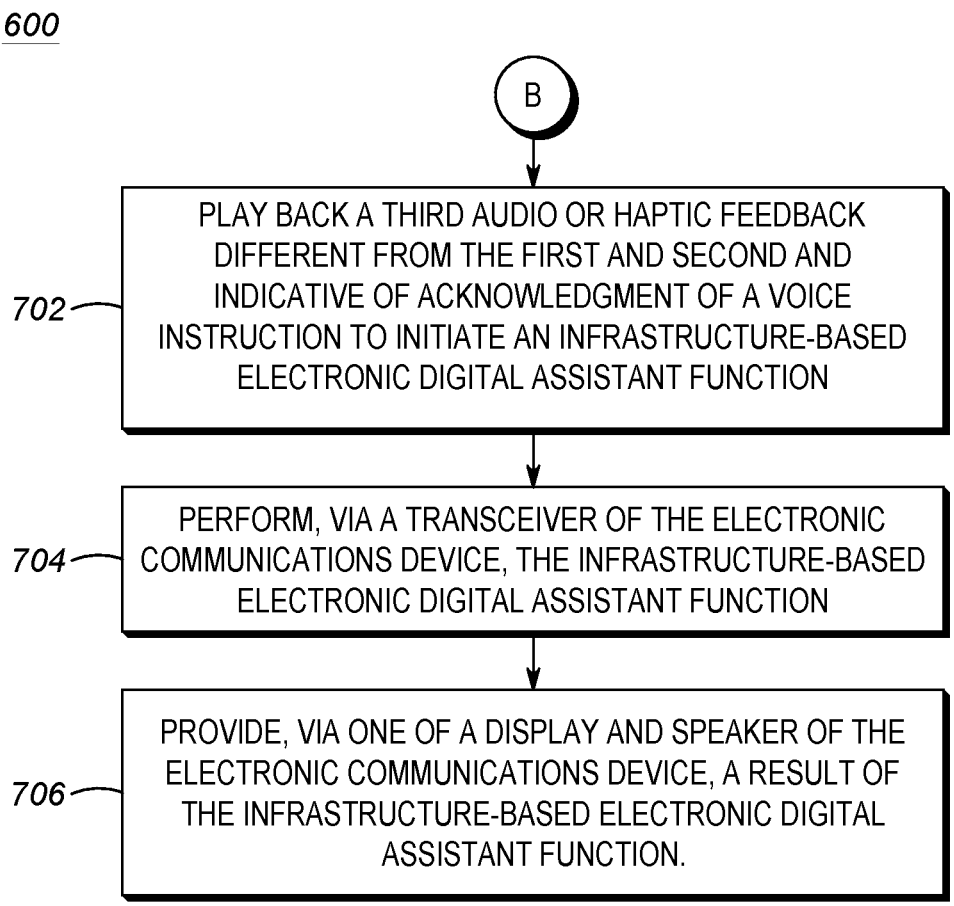
FIG. 7 illustrates a continuation of the flowchart of FIG. 6 setting forth a second set of process blocks for operating the first or second electronic communication device including the single input interface for electronic digital assistant and voice control access, in accordance with some embodiments.

Turning now to FIG. 6, a flowchart diagram illustrates a process 600 for interacting with an electronic digital assistant function and voice control function of an electronic communications device via a single input interface. While a particular order of processing blocks, message receptions, and/or message transmissions is indicated in FIGS. 6-7 for exemplary purposes, timing and ordering of such blocks, receptions, and transmissions may vary where appropriate without negating the purpose and advantages of the examples set forth in detail throughout the remainder of this disclosure.

Process 600 begins at block 602, where the electronic communications device detects a first activation (e.g., not in the middle of a previously activated sequence of process 600) of a single voice function external input interface of an electronic communication device, such as activation of the single voice function external input interface 322 of the radio 104 of FIG. 4 in any manner consistent with that set forth above. Activation at block 602 may include a single press of the single voice function external input interface for a minimum threshold period of time, such as 500 ms or 1 or 2 s, or the continuous hold-down (or finger on for a softkey) of the single voice function external input interface during blocks 604-606. Other possibilities exist as well.

At block 604, the electronic communications device plays back a first audio or haptic feedback indicative of confirmed activation of the voice control function. The first audio or haptic feedback may be the voice control ready auditory tone 452 and may be provided in any manner as already set forth earlier.

At block 606, the electronic communications device monitors for one of two preconfigured voice control keywords, a first of which is associated with a particular local electronic device function and a second of which is associated with initiating an infrastructure-based electronic digital assistant function. Of course, and in some embodiments and as set forth elsewhere herein in exemplary form, the electronic communication device may support a plurality of local electronic device function voice control keywords and/or a plurality of infrastructure-based electronic digital assistant function initiating voice control keywords, and the terms first and second with respect to process 600 are merely used as distinguishing prefixes. And furthermore, as the term "keyword" is used herein, in some embodiments the keyword may be a single word term (such as "partner"), while in other embodiments, the keyword may be a multiple term phrase (such as "volume up 25%").

As mentioned earlier, the first voice control keyword that is associated with a local electronic device function may be a keyword matched to a stored database of voice tokens, and may be associated with a function that can be completed locally at the electronic communication device without access or assistance via an external server or cloud compute cluster accessible via a wired or wireless network, such as wireless RAN 152. Examples of local device functions given earlier include volume changes, channel changes, and battery status of the electronic communications device, but may further include radio profile changes (e.g. selecting one of a plurality of pre-stored radio profiles), turning radio scan on and/or off (e.g., scanning one or more pre-programmed channels for active audio and/or video traffic), cancelling a previous voice command or other manually entered or initiated command, requesting a current radio parameter status (such as current channel, frequency, or zone), changing a primary talkgroup target for a talkgroup call, changing a private call target for a private call, activating the emergency button, or requesting a current time and/or date, among other possibilities.

And as mentioned earlier, the second voice control keyword is associated with activation of an electronic digital assistant function, which may be a keyword matched to a stored database of voice control keywords for entering the electronic digital assistant mode (e.g., such as "hey ViQi," "partner", or others) that cause the electronic communication device to enter an electronic digital assistant mode that requires communication with a remote server or cloud-compute cluster to discern an intent of the user. As mentioned earlier, several voice control keyword shortcuts may simultaneously cause the electronic communication device to enter the electronic digital assistant mode and to perform an electronic digital assistant query without requiring further audio input from the user, as will be described in more detail below with respect to FIG. 7.

Examples of electronic digital assistant functions given earlier include looking up a particular vehicular license plate in a remote license plate database for vehicular and/or owner information (e.g., such as registration date, expiration date, make, model, outstanding tickets or warrants, owner's name, owner's address, pollution control test status, etc.), looking up a user's driver's license number to receive driver information (e.g., such as registration date, expiration date, make, model, outstanding tickets or warrants, owner's name, owner's address, pollution control test status, etc.), to request additional backup, and to warn others of nearby dangers, but may also include vehicle identification number checks (e.g., to similarly vehicle information such as registration date, expiration date, make, model, outstanding tickets or warrants, owner's name, owner's address, pollution control test status, etc.), a criminal history or outstanding warrant lookup using a person's name, a be-on-the-lookout (BOLO) request to create a new BOLO, and a video feed request to be provided access to and/or a stream of an indicated video feed, among other possibilities. A limited number of all of the supported electronic digital assistant functions may be made available via the "shortcut" method noted above, in which a user-spoken voice control keyword (that implies some portion of the required intent for the electronic digital assistant function, such as "run license plate") is used to locally match a corresponding voice token, and subsequent audio/information needed ("OHIO charlie tango 1 2 3 4") for the corresponding electronic digital assistant feature locally buffered for transmission to the server and/or cloud compute cluster via the wired and/or wireless connection for further processing and response.

This so-called "shortcut" method saves time as a separate electronic digital assistant audio input period does not have to be signaled and further user audio subsequently received to provide the electronic digital assistant feature and corresponding results. Accordingly, a limited number (e.g., less than 10%, less than 25%, or less than 50%) of all of the supported electronic digital assistant functions may have corresponding voice tokens stored in the local electronic communication device database for matching with portions of user audio to support the shortcut method. In other embodiments, however, no shortcut method may be provided at the electronic communication device in order to provide increased accuracy in voice control keyword recognition, and the user may be required to provide electronic digital assistant audio/intents via a separate electronic digital assistant voice input period signaled by the electronic communication device in accordance with the description set forth below.

In some embodiments, the single voice function external input interface is required to be held activated while the electronic communication device monitors for the first or second particular one of the pre-configured voice control keywords, and may be released substantially immediately thereafter. Absent detection of the first or second particular one of the pre-configured voice control keywords while the single voice function external input interface remains depressed, release of the single voice function external input interface may cause process 600 to be halted after block 606 and an error tone played back (e.g., a "boink").

In other embodiments, a single activation (depression, touch, etc.) and release of the single voice function external input interface causes the electronic communication device to start a timer during which the first or second preconfigured voice control keyword must be voiced by the user and detected by the electronic communication device, and absent that, the process 600 may halt after block 606 and an error tone played back (e.g., a "boink").

At block 608, the electronic communication device determines whether the user voiced the first preconfigured voice control keyword or the second preconfigured voice control keyword. In one particular example of the foregoing possibilities, the first particular one of the pre-configured voice control keywords is a volume change control for changing a playback volume at the electronic communications device, and the second particular one of the pre-configured voice control keywords is a general electronic digital assistant activation keyword. Other various combinations of the foregoing are possible as well.

At block 608, and responsive to determining that the first preconfigured voice control keyword associated with a local device control function was detected, processing proceeds to block 610, where the electronic communication device plays back a second audio or haptic feedback different from the first and indicative of an acknowledgment of a voice instruction to perform the local electronic device function. As mentioned earlier, a voice control dictionary including a voice token database may be used to identify the particular local electronic device function to perform, which may include, as one example, a volume change of an output speaker at the electronic communication device. The second audio or haptic feedback may be the voice control confirmation auditory tone 454 and may be provided in any manner as already set forth earlier. Once the local electronic device function is identified at block 610, the associated function is performed (e.g., the volume of the speaker is raised by 25% when the first preconfigured voice control keyword detected from the user was equivalent to "volume up 25%"). Any order of playback of the second audio or haptic feedback and performance of the local electronic device function may be employed, including in parallel.

Returning to block 608, and instead responsive to determining that the second preconfigured voice control keyword associated with an electronic digital assistant function was detected, processing proceeds to block 702 of FIG. 7, where the electronic communication device plays back a third audio or haptic feedback different from the first and second and indicative of an acknowledgment of a voice instruction to perform the electronic digital assistant function.

As mentioned earlier, a second preconfigured voice control keyword that causes process 600 to proceed from block 608 to block 702 may be a general electronic digital assistant function keyword (e.g., "hey ViQi" as set forth earlier) that then requires some additional voice intent to be captured from the user via a microphone of the electronic communication device, or in other embodiments, may be a shortcut electronic digital assistant function keyword that both causes the electronic communication device to enter the electronic digital assistant mode and provides some or all of a required intent that can be provided to the server and/or cloud-compute cluster, with or without further prompted voice input from the user (such as "run license plate OHIO charlie tango 1 2 3 4"). The third audio or haptic feedback may include the electronic digital assistant ready auditory tone 552, which may be provided in any manner as already set forth earlier, and/or may include the voice control confirmation auditory tone 454, which may be provided in any manner as already set forth earlier, among other possibilities.

When no shortcut keywords are provided or enabled at the electronic communication device, or they are but no shortcut keywords are detected, the third audio or haptic feedback may include the electronic digital assistant ready auditory tone 552 and act as an acknowledgment that the electronic digital assistant mode has been entered and that the user must further provide additional audio/intents for purposes of performing the electronic digital assistant function via the server and/or compute cluster accessible via the wired and/or wireless interface. On the other hand, when shortcut keywords are provided and/or enabled at the electronic communication device and are detected by the electronic communication device, the third audio or haptic feedback may include the voice control confirmation auditory tone 454 (or some entirely different and unique tone than that set forth herein) and act as an acknowledgment of successful recognition of the shortcut and that the electronic digital assistant search is being conducted (with or without additional prompted audio/intent from the user to complete the electronic digital assistant function). Other possibilities exist as well.

In some embodiments, and after a period of time passes (such as after 10, 30, or 60 s) after entering the electronic digital assistant mode without detection of any further audio input from the user (e.g., after an electronic digital assistant timeout period after entering the electronic digital assistant mode), or without detection of some audio from the particular user, or without detection of user audio at an insufficient threshold level (e.g., in dBs) to determine an intent by the user to provide further audio/intent (e.g., the user's attention gets drawn elsewhere and user audio is no longer directed directly into the microphone of the radio 104 or RSM 106), the electronic communication device may exit the electronic digital assistant mode and play back, via the one of the audio and haptic feedback interface, a fourth audio or haptic feedback different from the first, second, and third, indicative of an exit from the electronic digital assistant intent capture mode.

In still other embodiments, and while in the electronic digital assistant mode at block 702, the electronic computing device may continue to monitor the single voice function external input interface for a relatively short press relative to a longer press required to detect the first activation of the single voice function external input interface at block 602, and responsive to detecting the relatively short press, the electronic communication device may similarly exit the electronic digital assistant intent capture mode and play back, via the one of the audio and haptic feedback interface, a fourth audio or haptic feedback different from the first, second, and third, indicative of an exit from the electronic digital assistant intent capture mode.

The fourth audio or haptic feedback may be the electronic digital assistant exit auditory tone 554 and may be provided in any manner as already set forth earlier.

In some embodiments, and in between blocks 608 and 702, and where a shortcut keyword is not enabled and/or not detected, the electronic communication device may play back the voice control confirmation auditory tone 454 as described above to indicate that a voice control keyword was successfully detected. After the single voice function external input interface is then released by the user and then re-activated by the user (either held down again or pressed and released, to indicate that the user is ready to provide the additional voice/intent associated with a requested electronic digital assistant function), the electronic communication device may only then subsequently play back the electronic digital assistant ready auditory tone 552 at block 702. The electronic communication device may then continue to capture further audio/intent from the user while the single voice function external input interface is in the re-activated state, and only after the single voice function external input interface is again deactivated (released when previously held down, or pressed again for a relatively shorter period of time than the original activation of the single voice function external input interface in block 602), provide one or both of the audio/intent captured during the re-activated state and/or any audio captured during block 606 to the server or compute cluster via the network interface for natural language processing and response in accordance with the electronic digital assistant function.

Absent an exit from process 600, processing then proceeds to block 704, where the electronic communication device performs, via its transceiver (wired or wireless, for example via wireless RAN 152), the infrastructure-based electronic digital assistant function. As one example, the license plate look-up requested (separately after entering electronic digital assistant mode and in between blocks 702 and 704, or as a shortcut voice control keyword directly detected, for example, at blocks 606 and/or 608) as "run license plate OHIO charlie tango 1 2 3 4" may cause the electronic communication device to provide the captured audio for the command to a natural language processor (NLP) operating at, for example, cloud compute cluster 162. In response, the NLP parses the request, determines that it is a request for license plate information for a plate "CT1234", performs (if available locally) or transmits a request for license plate information to a license plate database, retrieves the available information (as mentioned earlier, including one or more of make, model, owner, past violations, outstanding warrants, insurance information, etc.) and responsively provides the retrieved available information back to the electronic communication device (via its transceiver). Other electronic digital assistant functions mentioned herein may operate in a same or similar manner.

Processing then proceeds to block 706, where the electronic computing device provides, via one of a display and speaker, the received result of the infrastructure-based electronic digital assistant function. As an example where an associated make and model associated with the license plate CT1234 is received as a "Ford Pinto, yellow", the electronic communication device may provide a "Ford Pinto, yellow" text to a display of the electronic communication device. In other embodiments, a local text to voice function may instead playback the text "Ford Pinto, yellow" via a speaker. In still further embodiments, digital audio that includes a voice-synthesized text "Ford Pinto, yellow" may be provided back to the electronic communication device for local playback via its speaker. Other possibilities exist as well.

After block 610 and/or after block 706, or after prematurely exiting the electronic digital assistant mode in accordance with the above description, the electronic communication device may again monitor for activation of the single voice function external input interface, and responsive to a subsequent detection thereof detected at block 602, again monitor for the particular one of the two or more preconfigured voice control keywords at block 604, beginning the process 600 over again.

3. CONCLUSION

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot electronically differentiate between a voice control and electronic digital assistant function via a single input interface, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic communications device having a user interface including a single input interface for electronic digital assistant and voice control access, the electronic device comprising:
   a single voice function external input interface for accessing both a voice control function for controlling local electronic communications device functions via voice and an electronic digital assistant function for performing infrastructure-based electronic digital assistant functions via voice;
   one of an audio and haptic feedback interface for providing respective audio and haptic feedback to a user of the electronic communication device;
   a microphone;
   a memory;
   a transceiver; and
   a controller configured to:
      detect a first activation of the single voice function external input interface, and responsively:
         play back, via the one of the audio and haptic feedback interface, a first audio tone or haptic feedback indicative of activation of a voice input function;

monitor, via the microphone, for a particular one of two or more pre-configured voice control keywords, at least a first particular one of the two or more pre-configured voice control keywords associated with a particular local electronic communications device function and at least a second particular one of the two or more pre-configured voice control keywords associated with initiating a particular infrastructure-based electronic digital assistant function;

when the first particular one of the pre-configured voice control keywords is detected via the monitoring, responsively playing back, via the one of the audio and haptic feedback interface, a second audio tone or haptic feedback different from the first audio tone or haptic feedback and indicative of acknowledgement of a voice instruction to perform the particular local electronic communications device function, and subsequently or in parallel performing the particular local electronic communications device function;

when the second particular one of the pre-configured voice control keywords is detected via the monitoring, responsively:
play back, via the one of the audio and haptic feedback interface, a third audio tone or haptic feedback different from both the first audio tone or haptic feedback and the second audio tone or haptic feedback and indicative of acknowledgement of a voice instruction to initiate the particular infrastructure-based electronic digital assistant function;
perform, via the transceiver and as a function of one of an intent captured via the second particular one of the pre-configured voice control keywords and a further intent captured via the microphone after play back of the third audio tone or haptic feedback, the particular infrastructure-based electronic digital assistant function; and
subsequently provide, via one of a display and a speaker, a result of the particular infrastructure-based electronic digital assistant function received via the transceiver.

2. The electronic communications device of claim 1, wherein the third audio tone or haptic feedback is one indicative of a successful transition into an electronic digital assistant intent recognition mode;
and wherein the controller further is configured to:
after playing back the third audio tone or haptic feedback and while the single voice function external input interface is activated, entering an electronic digital assistant intent capture mode and capture, via the microphone, the further intent captured via the microphone; and
after exiting the electronic digital assistant intent capture mode, play back, via the one of the audio and haptic feedback interface, a fourth audio tone or haptic feedback different from the first audio tone or haptic feedback, the second audio tone or haptic feedback, and the third audio tone or haptic feedback, indicative of an exit from the electronic digital assistant intent capture mode.

3. The electronic communications device of claim 1, wherein the second particular one of the pre-configured voice control keywords is one of a plurality of pre-configured voice control keywords each further including a different integrated intent for performing the particular infrastructure-based electronic digital assistant function without requiring an additional voice input from a user of the electronic communications device; and
wherein the third audio tone or haptic feedback is one indicative of successful recognition of the intent captured via the second particular one of the pre-configured voice control keywords.

4. The electronic communications device of claim 1, wherein the single voice function external input interface is integrated in a speaker grill of the electronic communications device.

5. The electronic communications device of claim 1, wherein the single voice function external input interface is held activated while the first or second particular one of the pre-configured voice control keywords is voiced and is released and thus deactivated substantially immediately thereafter and wherein the second particular one of the pre-configured voice control keywords is detected, the controller further configured to:
after playing back the third audio tone or haptic feedback and after the single voice function external input interface is detected as re-activated after being released and deactivated, entering an electronic digital assistant intent capture mode;
during or after entering the electronic digital assistant intent capture mode, playing back, via the one of the audio and haptic feedback interface, a fourth audio tone or haptic feedback different from the first audio tone or haptic feedback, the second audio tone or haptic feedback, and the third audio tone or haptic feedback, indicative of a successful entry into the electronic digital assistant intent capture mode;
capture, via the microphone, the further intent captured via the microphone while the single voice function external input interface remains re-activated; and
after detecting a second release and deactivation of the single voice function external input interface, providing the captured further intent, via the transceiver, to an infrastructure natural language processing server.

6. The electronic communications device of claim 5, wherein the fourth audio tone or haptic feedback is a tone in a range of 700-800 Hz for 25 ms followed by 25 ms of silence followed by a tone in a range of 1000-1100 Hz for 25 ms followed by 25 ms of silence followed by a tone in a range of 700-800 Hz for 25 ms followed by 25 ms of silence followed by a tone in a range of 1000-1100 Hz for 25 ms.

7. The electronic communications device of claim 5, the controller further configured to:
while remaining in the electronic digital assistant intent capture mode, monitoring the single voice function external input interface for a relatively short press relative to a relatively longer press required to detect the first activation of the single voice function external input interface; and
responsive to one of detecting the relatively short press while in the electronic digital assistant intent capture mode and detecting an expiry of an electronic digital assistant intent capture mode timeout timer, exiting the electronic digital assistant intent capture mode.

8. The electronic communications device of claim 7, the controller further configured to:
upon exiting the electronic digital assistant intent capture mode, play back, via the one of the audio and haptic feedback interface, a fourth audio tone or haptic feedback different from the first audio tone or haptic feedback, the second audio tone or haptic feedback, and the third audio tone or haptic feedback indicative of a successful exit of the electronic digital assistant intent capture mode.

9. The electronic communications device of claim 8, wherein the fourth audio tone or haptic feedback is a tone in a range of 1000-1100 Hz for 25 ms followed by 25 ms of silence followed by a tone in a range of 700-800 Hz for 25 ms.

10. The electronic communications device of claim 7, the controller further configured to: after exiting the electronic digital assistant intent capture mode, a subsequent activation of the single voice function external input interface causing the electronic communications device to again monitor for the particular one of the two or more preconfigured voice control keywords.

11. The electronic communications device of claim 1, wherein the first particular one of the pre-configured voice control keywords is one selected from a volume change control for changing a playback volume at the electronic communications device, a channel change for changing a communications channel at the electronic communications device, a talkgroup target change for changing a target talkgroup at the electronic communications device, a battery status query for querying a battery status of the electronic communications device, and a private call target change for changing a private call target at the electronic communications device.

12. The electronic communications device of claim 1, wherein the second particular one of the pre-configured voice control keywords is one selected from a general electronic digital assistant activation keyword, a drivers license lookup electronic digital assistant activation keyword, a vehicle identification number lookup electronic digital assistant activation keyword, a location request electronic digital assistant activation keyword, and a video feed request electronic digital assistant activation keyword.

13. The electronic communications device of claim 1, wherein the first particular one of the pre-configured voice control keywords is a volume change control for changing a playback volume at the electronic communications device, and the second particular one of the pre-configured voice control keywords is a general electronic digital assistant activation keyword.

14. The electronic communications device of claim 1, wherein the first audio tone or haptic feedback is a tone in a range of 700-800 Hz for 25 ms followed by 25 ms of silence followed by a tone in a range of 1000-1100 Hz for 25 ms.

15. The electronic communications device of claim 1, wherein the first, second, and third audio tones or haptic feedbacks are each tones and each a distinct tone from one another.

16. The electronic communications device of claim 1, wherein the first, second, and third audio tones or haptic feedbacks are each haptic feedbacks and each a distinct haptic feedback from one another.

17. The electronic communications device of claim 1, wherein the particular local electronics communication device function is one of a plurality of different local electronics communication device functions of a local electronic communication device function type, the same second audio tone or haptic feedback being played back whenever one of the plurality of different local electronic communication device functions is detected via the microphone.

18. The electronic communications device of claim 1, wherein the particular infrastructure-based electronic digital assistant function is one of a plurality of different infrastructure-based electronic digital assistant functions of an infrastructure-based electronic digital assistant function type, the same third audio tone or haptic feedback being played back whenever one of the plurality of different infrastructure-based electronic digital assistant functions is detected via the microphone.

19. A method for interfacing with an electronic communications device having a user interface including a single input interface for accessing an electronic digital assistant and voice control, the method comprising:
  detecting a first activation of a single voice function external input interface for accessing both a voice control function for controlling local electronic communications device functions via voice and an electronic digital assistant function for performing infrastructure-based electronic digital assistant functions via voice, and responsively:
    playing back, via the one of an audio and haptic feedback interface, a first audio tone or haptic feedback indicative of activation of a voice input function;
    monitoring, via a microphone, for a particular one of two or more pre-configured voice control keywords, at least a first particular one of the two or more pre-configured voice control keywords associated with a particular local electronic communications device function and at least a second particular one of the two or more pre-configured voice control keywords associated with initiating a particular infrastructure-based electronic digital assistant function;
  when the first particular one of the pre-configured voice control keywords is detected via the monitoring, responsively playing back, via the one of the audio and haptic feedback interface, a second audio tone or haptic feedback different from the first audio tone or haptic feedback and indicative of acknowledgement of a voice instruction to perform the particular local electronic communications device function, and subsequently or in parallel performing the particular local electronic communications device function;
  when the second particular one of the pre-configured voice control keywords is detected via the monitoring, responsively:
    playing back, via the one of the audio and haptic feedback interface, a third audio tone or haptic feedback different from both the first audio tone or haptic feedback and the second audio tone or haptic feedback and indicative of acknowledgement of a voice instruction to initiate the particular infrastructure-based electronic digital assistant function;
    performing, via a transceiver and as a function of one of an intent captured via the second particular one of the pre-configured voice control keywords and a further intent captured via the microphone after playing back of the third audio tone or haptic feedback, the particular infrastructure-based electronic digital assistant function; and
    subsequently providing, via one of a display and a speaker, a result of the particular infrastructure-based electronic digital assistant function received via the transceiver.

20. A system for interfacing with an electronic communications device having a user interface including a single input interface for accessing an electronic digital assistant and voice control, the system comprising:

an electronic communications device having a user interface including a single input interface for electronic digital assistant and voice control access, the electronic device comprising:
- a single voice function external input interface for accessing both a voice control function for controlling local electronic communications device functions via voice and an electronic digital assistant function for performing infrastructure-based electronic digital assistant functions via voice;
- one of an audio and haptic feedback interface for providing respective audio and haptic feedback to a user of the electronic communication device;
- a microphone;
- a memory;
- a transceiver; and
- a controller configured to:
  - detect a first activation of the single voice function external input interface, and responsively:
    - play back, via the one of the audio and haptic feedback interface, a first audio tone or haptic feedback indicative of activation of a voice input function;
    - monitor, via the microphone, for a particular one of two or more pre-configured voice control keywords, at least a first particular one of the two or more pre-configured voice control keywords associated with a particular local electronic communications device function and at least a second particular one of the two or more pre-configured voice control keywords associated with initiating a particular infrastructure-based electronic digital assistant function;
    - when the first particular one of the pre-configured voice control keywords is detected via the monitoring, responsively playing back, via the one of the audio and haptic feedback interface, a second audio tone or haptic feedback different from the first audio tone or haptic feedback and indicative of acknowledgement of a voice instruction to perform the particular local electronic communications device function, and subsequently or in parallel performing the particular local electronic communications device function;
    - when the second particular one of the pre-configured voice control keywords is detected via the monitoring, responsively:
      - play back, via the one of the audio and haptic feedback interface, a third audio tone or haptic feedback different from both the first audio tone or haptic feedback and the second audio tone or haptic feedback and indicative of acknowledgement of a voice instruction to initiate the particular infrastructure-based electronic digital assistant function;
      - provide, via the transceiver and to an infrastructure-based natural language processing server, one of an intent captured via the second particular one of the pre-configured voice control keywords and a further intent captured via the microphone after play back of the third audio tone or haptic feedback for performing the particular infrastructure-based electronic digital assistant function; and
      - subsequently provide, via one of a display and a speaker, a result of the particular infrastructure-based electronic digital assistant function received via the transceiver;
- an infrastructure natural language processing server comprising:
  - a second memory;
  - a second transceiver; and
  - a second controller configured to:
    - receive, via the second transceiver and from the electronic communications device, the one of the intent captured via the second particular one of the pre-configured voice control keywords and the further intent captured via the microphone after play back of the third audio tone or haptic feedback for performing the particular infrastructure-based electronic digital assistant function;
    - perform the particular infrastructure-based electronic digital assistant function; and
    - transmit, via the second transceiver, the result of the particular infrastructure-based electronic digital assistant function to the electronic communications device via the second transceiver for play back.

\* \* \* \* \*